United States Patent
Martinelli et al.

(10) Patent No.: US 7,831,515 B2
(45) Date of Patent: Nov. 9, 2010

(54) METHOD AND SYSTEM FOR SUBSCRIPTION-BASED, ENTITLEMENT-DRIVEN LICENSE KEY GENERATION AND DISTRIBUTION FOR DIGITAL GOODS

(75) Inventors: Paul Martinelli, Berkeley, CA (US); Tobid Pieper, Orinda, CA (US); Richard Northing, Alamo, CA (US); Ariane Habets, Pleasant Hill, CA (US)

(73) Assignee: Intraware. Inc., Orinda, CA (US)

( * ) Notice: Subject to any disclaimer, the term of this patent is extended or adjusted under 35 U.S.C. 154(b) by 1221 days.

(21) Appl. No.: 11/067,035

(22) Filed: Feb. 24, 2005

(65) Prior Publication Data

US 2005/0131833 A1   Jun. 16, 2005

Related U.S. Application Data

(63) Continuation-in-part of application No. 10/635,840, filed on Aug. 5, 2003, now abandoned.

(51) Int. Cl.
  G06F 21/00     (2006.01)
  H04N 7/167     (2006.01)
(52) U.S. Cl. .................... 705/59; 705/50; 705/65; 705/75; 380/201
(58) Field of Classification Search ........... 705/59
  See application file for complete search history.

(56) References Cited

U.S. PATENT DOCUMENTS

| | | | |
|---|---|---|---|
| 6,418,421 B1 * | 7/2002 | Hurtado et al. | 705/54 |
| 6,678,695 B1 * | 1/2004 | Bonneau et al. | 1/1 |
| 7,110,984 B1 * | 9/2006 | Spagna et al. | 705/57 |
| 7,120,800 B2 * | 10/2006 | Ginter et al. | 713/193 |
| 7,181,017 B1 * | 2/2007 | Nagel et al. | 380/282 |
| 7,316,032 B2 * | 1/2008 | Tayebi et al. | 705/51 |
| 2002/0138441 A1 | 9/2002 | Lopatle | |
| 2003/0023963 A1 | 1/2003 | Birkholz et al. | |
| 2003/0217011 A1 | 11/2003 | Peinado et al. | |
| 2004/0249756 A1 | 12/2004 | Garibay et al. | |
| 2005/0086501 A1 * | 4/2005 | Woo et al. | 713/189 |
| 2005/0108173 A1 * | 5/2005 | Stefik et al. | 705/57 |
| 2006/0080742 A1 * | 4/2006 | Nakayama et al. | 726/27 |
| 2006/0089912 A1 * | 4/2006 | Spagna et al. | 705/51 |
| 2006/0277122 A1 * | 12/2006 | Shear et al. | 705/28 |
| 2008/0071686 A1 * | 3/2008 | Tayebi et al. | 705/51 |
| 2008/0107264 A1 * | 5/2008 | Van Wie et al. | 380/201 |

* cited by examiner

*Primary Examiner*—Charles C Agwumezie
(74) *Attorney, Agent, or Firm*—Michael A. Glenn; Glenn Patent Group

(57) ABSTRACT

A method and system for subscription-based, entitlement-driven license key generation and distribution for digital goods allows digital goods vendors to manage rights of customers having maintenance contracts or subscriptions. Rights management includes the ability of the vendor to specify upgraded license rules and automatically update entitlements for all customers having current contracts and/or subscriptions, as specified by the upgraded license rules. Upgrades and accompanying license keys are proactively offered to customers without requiring additional sales transactions.

33 Claims, 6 Drawing Sheets

METHOD AND SYSTEM FOR SUBSCRIPTION-BASED, ENTITLEMENT-DRIVEN LICENSE KEY GENERATION AND DISTRIBUTION FOR DIGITAL GOODS

CROSS REFERENCE TO RELATED APPLICATION

This application is a continuation-in-part of U.S. patent application Ser. No. 10/635,840, filed Aug. 5, 2003 now abandoned, and published as US 2005/0033652 A1, which is hereby incorporated by reference as if fully set forth herein.

FIELD OF THE INVENTION

The invention relates to digital rights management. More particularly, the invention relates to management of licenses to electronically-distributed digital goods.

BACKGROUND

Licensing is a common business model in the software and digital goods industries, serving as an important weapon against pirating of digital goods and ensuring compliance with contractual rights. Piracy, illegally reproducing and distributing a work, has historically been a major problem for manufacturers and providers of digital goods such as software. In a licensing scheme, a purchaser does not actually acquire a computer program outright, but, rather purchases a right to use the software according to license terms that specify the conditions of use: manner, time, location and duration of use, for example. Generally, the licensee's ability to transfer or reassign the license is extremely limited, or completely forbidden.

Early software licenses were based on a trust model, wherein a copy of the license is distributed with the media containing a software program. The license specified the terms of use and the licensee was trusted to comply with the license. Shrink-wrap licenses were printed certificates that accompanied single copies of a digital product distributed on removable media such as CD's or diskettes. A site license, commonly used to sell software to large entities such as corporations, was a single license that permitted installation of multiple copies of software on many computers across the enterprise. As distribution of software via publicly-accessible networks became more common, online licenses came into being, wherein a copy of a license accompanied software downloaded from the network. Typically, the purchaser was required to assent to the license terms before downloading the software. Modernly, computer software licenses have been electronically issued as digital certificates, each paired with a single machine, that can unlock a copy of a software program on that machine.

Digital delivery has emerged as an efficient and profitable method of distributing digital goods such as software. While some vendors of digital goods offer simple downloads from their web sites, these services provide only limited value to the vendor and the vendor's customers. There is a growing demand from end-users for increased services and from vendors for better management and control of the complete delivery process. J. Brentano, T. Pieper, P. Martinelli, B. Thompson, *Method and system for managing digital goods*, U.S. patent application Ser. No. 10/635,840 (Aug. 5, 2003), which is not admitted to be prior art to the present invention by its inclusion in this Background section, provides a portal from which a vendor of digital goods distributes its goods on a subscription basis to its customer base.

The processes for distributing software and for distributing the licenses that unlock it are closely related. Both are based on the same entitlement data, both are received by the same end users, and both are needed for installation and operation of the product. Software is always evolving, with new releases and bug fixes issued at frequent intervals. Often a customer needs an upgraded version of the software but not a new license. Other times, new license keys are required for major software upgrades. Software licensing has now evolved from pure piracy prevention to enabling the sale of various market-driven configurations of the same product. As product bundles become more intricate, there is a growing need a way to generate and distribute license keys that supports more comprehensive licensing strategies. For example, even in digital distribution environments, release of an upgraded version of a product that requires issuance of an updated set of licensing keys has conventionally required a vendor to manually process an upgrade order to generate the new licensing keys, even though the customer may have already been entitled to the new product. It would be a great advantage to provide a process that spared the vendor the operational overhead and extra cost associated with processing the upgrade order.

There exists, therefore, a need in the art for a method of managing licensing and distributing digital goods that will:

- allow customers purchasing software subscriptions or maintenance contracts to access all new versions of software and the required license keys for the entire duration of their existing entitlements;
- provide a mechanism for vendors to specify upgraded versions requiring new license keys, in such as way as to be automatically applied to all of their customers' valid subscription entitlements;
- notify customers whenever a new set of license keys is required to operate upgraded product versions in which they are entitled;
- for any release of software, make the customer aware of which license keys (new or old) are required for the operation of the specific software release; and
- generate new license keys using existing entitlement data, previous license key data, and any new customer-input data by interfacing with an underlying license key generator, regardless of the licensing technology used by the software product.

SUMMARY

In recognition of the above needs the invention provides a method and system for subscription-based, entitlement-driven license key generation and distribution for digital goods. A system for electronic software delivery and management (EDSM) allows subscribing software vendors to administer licensing for products distributed using the system. Software to be distributed and metadata about the software are loaded onto the system. The metadata include at least licensing rules, but may include other information about the software such as version number and/or vendor part or product number. The metadata describe one or more 'Catalog Items'—salable items—and one or more 'Products'—versions—associated with each 'Catalog Item.' 'Files'—downloadable items—are associated to each 'Product.' When a customer places a subscription order for one or more Catalog Items,' the system creates an 'Entitlement'—a subscription—that includes all 'Products' currently active on the system for the 'Catalog Item' requested, whereupon notification is sent to the customer and subscription keys are generated and delivered to the customer.

At some later time before the expiration of the subscription, the vendor may associate a new 'Product,' requiring a new set of keys distinct from the keys to previous 'Products' to the 'Catalog Item.' All 'Entitlements' for all customers that contain the new 'Product,' which have not yet expired are updated to grant all customers use of the new 'Product.' If the new 'Product' requires a new license, affected customers are notified that the new product is available and that the new product requires a new set of license keys. By means of the same system for electronic software delivery, the customers generate the new license keys required to activate the new 'Product.' In an alternative embodiment, the new license keys are generated and sent directly via the notification.

DESCRIPTION

The invention provides a hosted, network-based delivery and support solution that enables vendors of digital goods to easily deliver, track, and manage the digital goods and 'Entitlements' that the vendors distribute to their global customers. Advantageously, the solution is rapidly implemented and seamlessly integrated into a customized web site, and supports any e-commerce, direct, or channel sales model. The invention finds particular application in electronic distribution of digital goods such as software.

Figure 1:
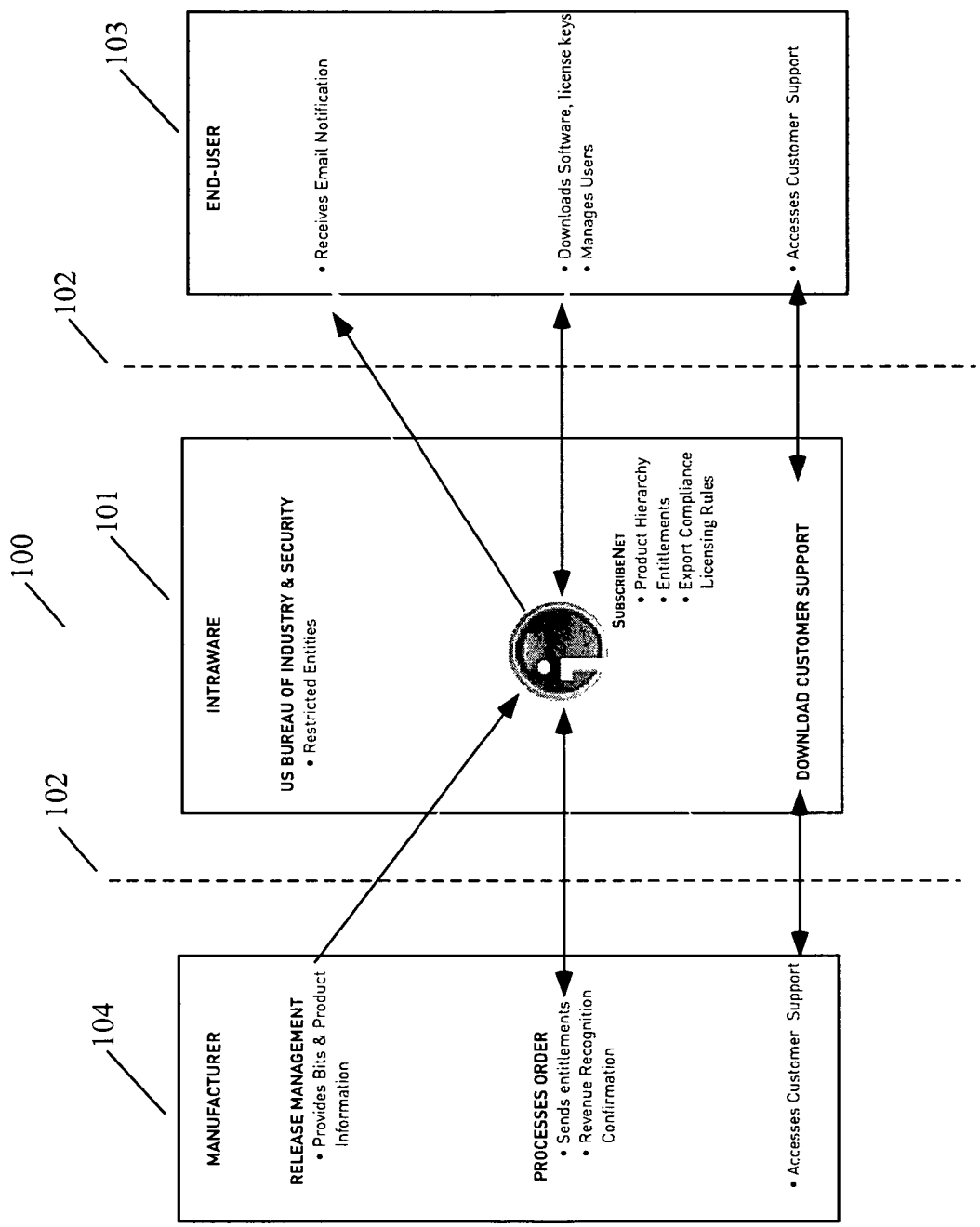
FIG. 1 is a top level diagram of a system for distributing digital goods and accompanying license keys according to the invention.

FIG. 1 provides a top-level functional diagram of a system for managing digital goods 100. The system may be implemented across a publicly accessible network, such as the Internet. Data flow within the invented system is also shown. The invented system is built around a repository 101, the repository including one or more servers and associated mass storage that store a copy of a vendor's 'Product,' documentation, release notes and any other related material. These are typically provided by the vendor 102 as part of the original implementation of the product management and distribution service provided through the system. Subsequently, the materials are refreshed as products are updated. The system also associates each downloadable file (image) with one or more vendor part numbers. Typically, the system operator makes the system available to vendors on a subscription, or fee basis; however, other business models are possible.

Once the images are loaded into the system, and the part numbers created, the system is ready to process orders 103 and deliver the digital goods, for example, software, to the vendor's customers 104. This 'Entitlement' process typically happens with, for example, an XML-based data feed that originates with the vendor's order management or ERP (enterprise resource planning) system. The data feed specifies which customers are being entitled to which part numbers, and under what license and maintenance terms. The 'Entitlement' data feed may also contain other vendor-specific information, such as license keys and support codes. Other methods of transmitting order information to the system may be envisioned by one having an ordinary level of skill and are well within the scope of the invention.

The system processes the data feed and creates user accounts, if necessary, and the 'Entitlements' that allow the customer to see and download the appropriate images when they log into the service web site. The system also associates all the vendor and customer specific information with the vendor part numbers so that they are available at the time of delivery.

The system then generates e-mail messages 105 to designated contacts within the customer account to notify them that their software is available. The email may include a unique URL that gives the customer access to his or her own dynamically generated, and password-protected web site, thus providing the customer a personalized, digital goods management portal. The web site may be branded to the vendor, having the same look and feel as the rest of the vendor's web site. Through this personalized web site, the customer gains ready access to any digital goods the customer is entitled to, as well as any related documentation, license keys, release notes, and contact information, not only for the current order, but also for any previous releases to which that customer is entitled.

The system can also be configured so that when the customer first attempts to download a particular product, the customer is required to read and to accept online end-user license agreement (EULA). A reporting function 107 delivers regular reports to the vendor, allowing the vendor to closely monitor activities from all of the vendor's customer accounts.

Software and software metadata (such as version number and licensing rules) is loaded into the system. The data includes at least one 'Catalog Item' (saleable item), one or more 'Products' (versions) —each with effective and expiration dates —associated to the 'Catalog Item,' and a set of 0 or more 'Files' (downloadable items) that make up the 'Product (s).'

Figure 2:
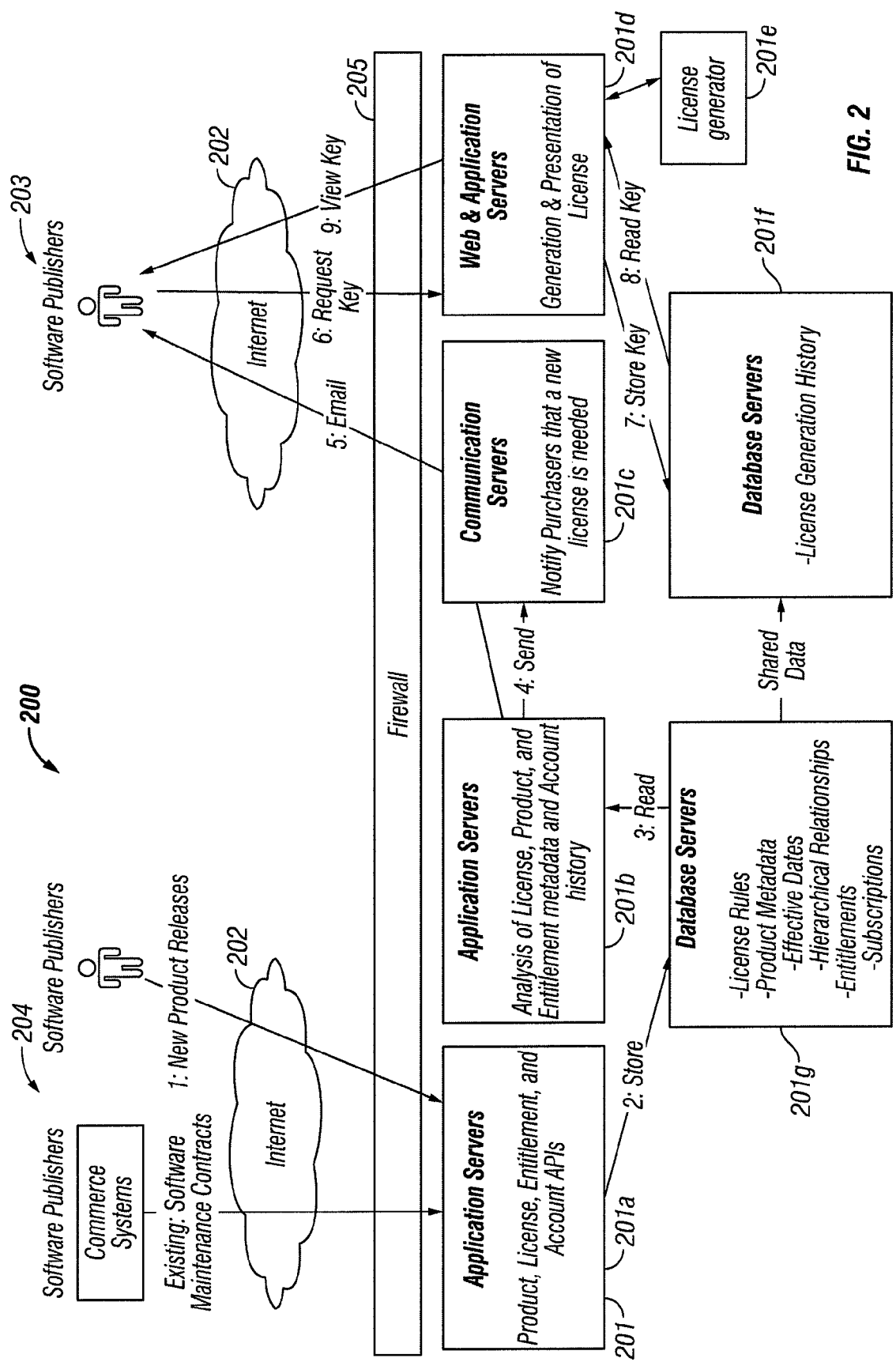
FIG. 2 provides a more detailed diagram of the system of FIG. 1, including data flow, according to the invention.

Turning now to FIG. 2, shown is a more detailed diagram of an architecture 200 for the system of FIG. 1. Data flows in the system of FIG. 1 are also shown and described in FIG. 2. As described above, the invention provides a system wherein a central repository 201 includes at least one server and associated data stores. One embodiment of the invention includes application servers 201a and 201b, communication servers 201c and web and application servers 201d. Additionally, the data stores are located on database servers 201g and 201f. One skilled in the art will readily appreciate that the components 201a-g are to be seen as functional units, rather than physical units. Thus, embodiments of the invention are possible wherein each functional unit resides on its own server machine. Other embodiments are possible wherein all of the functional units are combined on a single physical server. Other embodiments of the invention are possible wherein various combinations of functional units are distributed across two or more machines. For example, an embodiment of the invention is possible that includes a web server, an email server, an application server and a database server. Any combination of physical units that substantially embodies at least the functional units herein described is consistent with the spirit and scope of the invention.

Software vendors 204 and software purchasers 203 interact with the central repository 201 over a network connection. Typically, the repository 201 is located behind a firewall 205 or other security system for protecting the repository from external threats. As shown in FIG. 2 the network medium may be a publicly-accessible network, such as the Internet 202. However other embodiments are possible wherein the network is a LAN (local area network) a WAN (wide area network), a VPN (virtual private network) or any other medium wherein computers are connected to each other by communications facilities. Interaction of software vendors 204 with the system may be by way of data-feed as previously described, or vendors may also configure 'Catalog Item's, products and 'Entitlements' manually, from a client machine, by means of a user interface. Such user interface is described in detail in co-owned, co-pending U.S. patent applications Ser. No. 10/635,840, Method and system for managing digital goods, filed Aug. 5, 2003 and published as US 2005/0033652 A1, and Ser. No. 10/835,688, System and method for bulk transfer of digital goods, filed Apr. 29, 2004, and published as US 2005/0033774 A1, which is hereby incorporated by reference as if fully set forth herein.

Returning now to FIG. 2, 'Product' data, licensing rules, and account information is communicated from the software vendor 204 over the network 202 to the repository 201, where it is received by an application server 201a. As will be further described infra, the services performed by servers 201a-d are integrated within a licensing engine 301. As the vendor 204 sells products, typically in the form of software maintenance contracts, order information is communicated to the repository in the form of 'Entitlements.' Additionally, as is common among entities producing digital goods such as software, upgrades, that is new 'Products' within the context of the invention, are frequently distributed. An upgrade necessitates updating of 'Entitlements' for the 'Catalog Item' being upgraded. All data relating to 'Catalog Items,' 'Entitlements,' licensing rules, and upgrades in the form of new 'Product' releases is received at the application server 201a.

Upon receipt at the application server 201a, the data are saved to a data store, typically housed on a database server 201g. In one embodiment, the data store constitutes a relational database. However, other means of storing collections of data, wherein the data can be searched, sorted and recombined, are consistent with the spirit and scope of the invention. The data store is structured in such a manner that it facilitates modeling and managing the complex product relationships necessitated by fixed-duration, subscription, or contract-based electronic distribution of digital goods. For example, in one embodiment, the data store is structured as a product hierarchy based on associations, or relationships among a collection of primary objects: 'Files,' 'Products,' 'Catalog Items,' and 'Entitlements.' The data store may include:

- license rules;
- product metadata, that includes effective dates, and hierarchical relationships; and
- 'Entitlement' data, that includes subscription dates.

After data is stored on database server 201g, an application server 201b reads the data from the data store. It is the function of the application server to evaluate license, product and 'Entitlement' metadata, and account history. Thus, when a software vendor adds a new product release to a 'Catalog Item,' it is the application server 201b that detects the addition, determines whether or not a licensing key needs to be generated for the new 'Product,' and evaluates 'Entitlements' for the 'Catalog Item' to determine customers 203 that are entitled to use and access the new 'Product.' Advantageously, the invention allows a vendor to specify in the license rules whether or not new license keys are required. When the application server 201b determines that a 'Catalog Item' has been upgraded it alerts a communications server 201c. Advantageously, the communication server 201c proactively notifies all entitled customers of the availability of the upgrade. At the same time, if a new license key is required for the upgrade, the communications server 201c notifies the entitled customer that a new license key is required for the upgrade. As shown, notification is typically by email.

Following notification of the availability of the upgrade, the customer 203 requests issue of the new key(s). In one embodiment of the invention, the customer requests the key(s) from a client machine via a user interface to a web and application server 201d. Following the request from the customer, a license generator 201e generates the new key(s). Conventionally, issuing license keys for product upgrades has required the customer to contact the software vendor. The software vendor then had to process a new purchase request in order to issue the license, which involved a large administrative overhead for the vendor and considerable inconvenience to the customer. Advantageously, the invention allows issuance of a new set of license keys without the necessity of processing a new purchase transaction. After the key is generated, it is stored on a database server 201f. The storage of keys, plus sharing of data with database server 201g, allows the system to maintain and display a licensing history for each entitled customer. Accordingly, the customer is able to view its complete licensing history and generate a new set of license keys to any product that it is entitled to use. The license generator may be native to the invented system. An additional embodiment incorporates a license generator from a third party source. After the key is stored, the server 201d reads the key from the data store for presentation to the customer. The key is presented to the customer by allowing the customer to view the key. Upon viewing the key, the customer is allowed to save the key locally and/or to print it. Upon saving the key, the customer is allowed use of the upgrade. An additional embodiment of the invention is possible wherein the upgrade key is provided with the email notification regarding the availability of the upgrade. The key may be provided as an attachment or in the body of the email. Thus, by providing the key with the notification, the customer is spared even the necessity of requesting the key.

Figure 3:
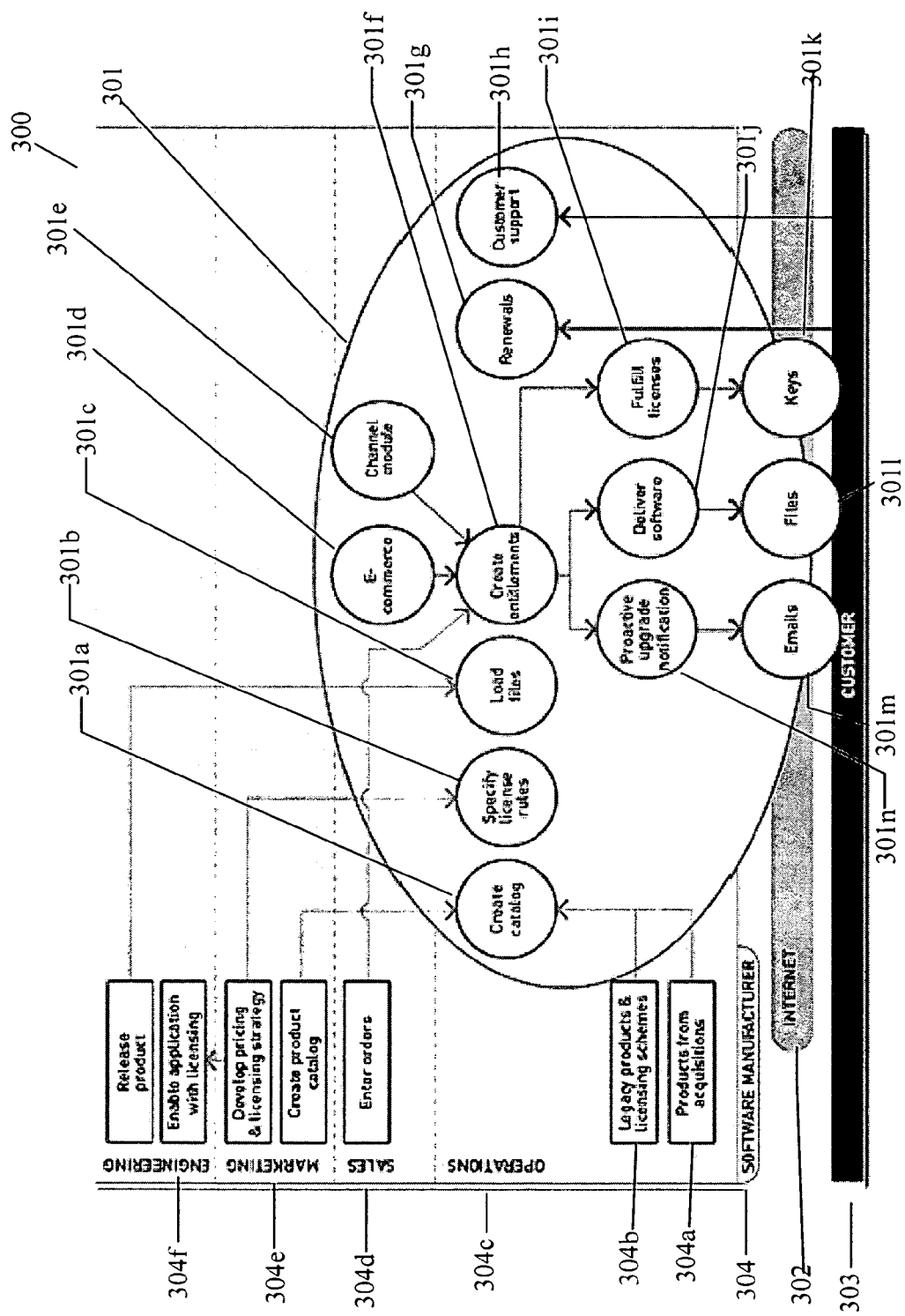
FIG. 3 is a functional schematic of a licensing engine from the system of FIGS. 1 and 2 according to the invention.

In one embodiment of the invention, the services and functions described with respect to FIG. 2 are collectively integrated as a licensing engine 301. FIG. 3 provides a functional schematic diagram of the licensing engine 301. The licensing engine includes a number of functional modules. FIG. 3 illustrates the relationship of the functional modules to each other. Also shown are the external inputs accepted by the engine and the outputs to the customer 303.

Functional Modules:
- Create Catalog (301a);
- Specify license rules (301b);
- Load files (301c);
- Create Entitlements (301f);
- Fulfill licenses (301i);
- Deliver software (301j);
- Proactive upgrade notification (301n);
- Emails (301m);
- Files (301i); and
- Keys (301k).

Additional function modules include:
- E-commerce (301d)
- Channel module (301e)

External inputs come from two sources, software vendors 305 and customers 303.
Inputs from vendors:
Products from acquisitions (304a);
Legacy products and licensing schemes (304b);
Enter orders (304d);
Create product catalog (304e);
Develop pricing and licensing strategy (304e);
Enable application with licensing
Release product (304f).
Inputs from customer:
Renewals 301g; and
Support requests 301h.

The following description of a typical software manufacturer and the source of the inputs to the licensing engine is intended only to illustrate a possible environment in which the invention may find application and is not intended to limit the invention. Part of a vendor's offerings is products from acquisitions and legacy products and licensing schemes. In a typical software manufacturer, these products may originate from operations 304c. Thus, as shown in FIG. 3, operations and marketing may share responsibility for defining the entities and relationships that make up the product catalog. Accordingly, input to the 'create catalog' module 301a may come from a variety of sources within the vendor's organization.

For new 'Products' or upgrades, the marketing unit 304e is typically responsible for developing a pricing and licensing strategy and therefore supplies input to the 'specify license rules' 301b module. Once the catalog has been created and the license rules specified and loaded onto the system, engineering 304f may release the product by loading files 301c onto the system. A sales department 304d enters orders, providing input to the 'Create entitlements' functional module 301f. Additionally, 'Entitlement' data may come from other sources; for example, an e-commerce 301d and channel 301e modules. A customer 303 interacts with the system via a network such as the Internet 302. The 'create entitlements' module 301f outputs notification to 'proactive upgrade notification' 301n, 'deliver software' 301j, and 'fulfill licenses' 301l modules. Outputs to the customer include email notifications 301m, files 301l and keys 301k. Inputs from customers include renewals 301g and customer support requests 301h.

Figure 4:
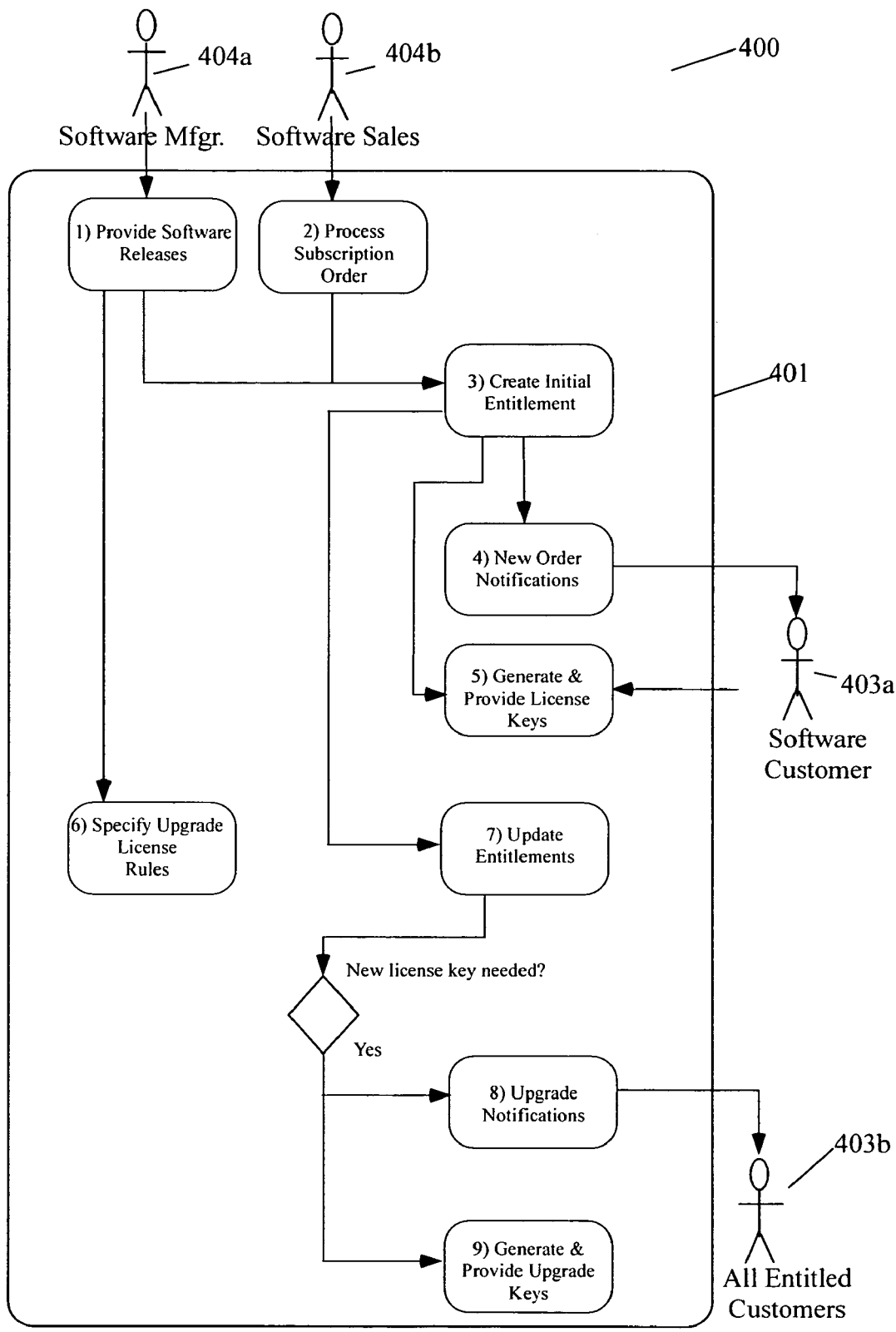
FIG. 4 is a flow diagram of a process for distributing digital goods and accompanying license keys according to the invention.

FIG. 4 shows a sequence of steps of a process 400 for subscription-based, entitlement-driven license key generation and distribution for digital goods according to the invention.

1. Software and software metadata, such as version number and licensing rules, is loaded into the system 401 by the software manufacturer 404a. The data includes at least one 'Catalog Item' (saleable item), one or more 'Products' (versions)—each with effective and expiration dates—associated to the 'Catalog Item,' and a set of 0 or more 'Files' (downloadable items) comprising the 'Product(s).'
2. A subscription order (maintenance contract) that contains effective and expiration dates, and which references a 'Catalog Item,' is entered into the system by software sales 404b.
3. An 'Entitlement' is created in the system that includes all of the 'Products' effective at the time the subscription order is effective.
4. Notification is sent to the customer, with information about the 'Entitlement' described in step 3.
5. Based on 'Products' effective on the subscription 'Entitlement,' license keys are generated and delivered to the customer.
6. At a later time than the effective subscription order date (but before the subscription's expiration date), a new 'Product' (version) is created and associated to the original 'Catalog Item' on the subscription order. This 'Product' also specifies that a new license key, distinct from the original license keys that the customer obtained in step 5, is required to unlock it.
7. All 'Entitlements' that contain a 'Catalog Item' now containing the new Product and which have not yet expired, are updated so as to allow the Customers usage of the new 'Product.'
8. If, as in step 6, the new 'Product' requires a new license, all Customers with 'Entitlements' described in step 7 are notified that the new 'Product' is available to them and that the new 'Product' requires a new set of license keys.
9. Customers who are entitled to receive the new Product are able to generate license keys required to activate or operate the new 'Product.' In an alterative embodiment, the new license keys can be generated and sent directly via the notification in step 8.

Figure 5:
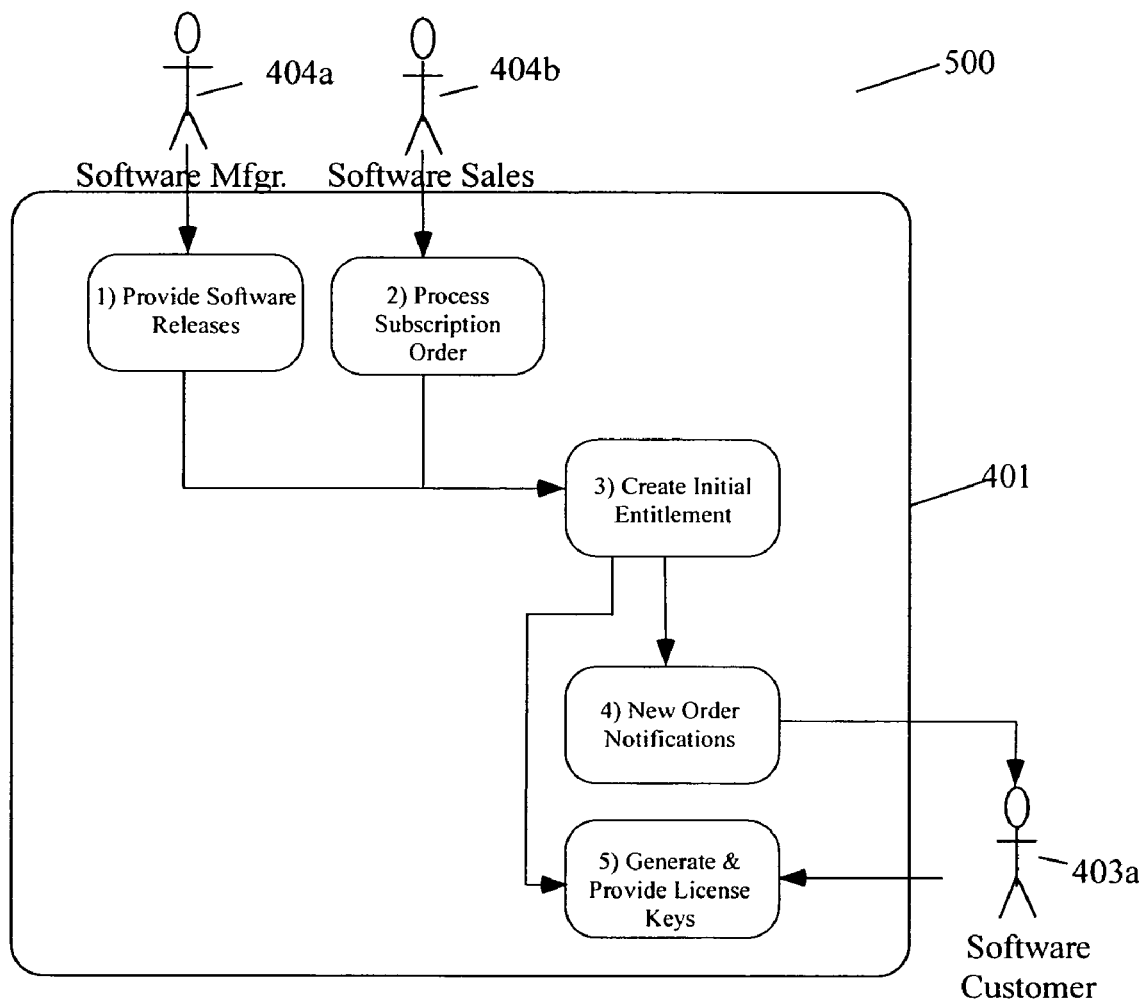
FIG. 5 is a flow diagram of a process for distributing digital goods upgrades and accompanying license keys according to the invention involving the processing of an initial purchase order according to the invention.

FIG. 5 shows a flow diagram of a process 500 for distributing digital goods and accompanying license keys according to the invention involving the processing of an initial purchase order according to the invention.

1. Software and software metadata, such as version number and licensing rules, is loaded into the system 401 by the software manufacturer 404a. The data includes at least one 'Catalog Item' (saleable item), one or more 'Products' (versions)—each with effective and expiration dates—associated to the 'Catalog Item,' and a set of 0 or more 'Files' (downloadable items) comprising the 'Product(s).'
2. A subscription order (maintenance contract) that contains effective and expiration dates, and which references a 'Catalog Item,' is entered into the system by software sales 404b.
3. An 'Entitlement' is created in the system that includes all of the 'Products' effective at the time the subscription order is effective.
4. Notification is sent to the customer, with information about the 'Entitlement' described in step 3.
5. Based on 'Products' effective on the subscription 'Entitlement,' license keys are generated and delivered to the customer.

Figure 6:
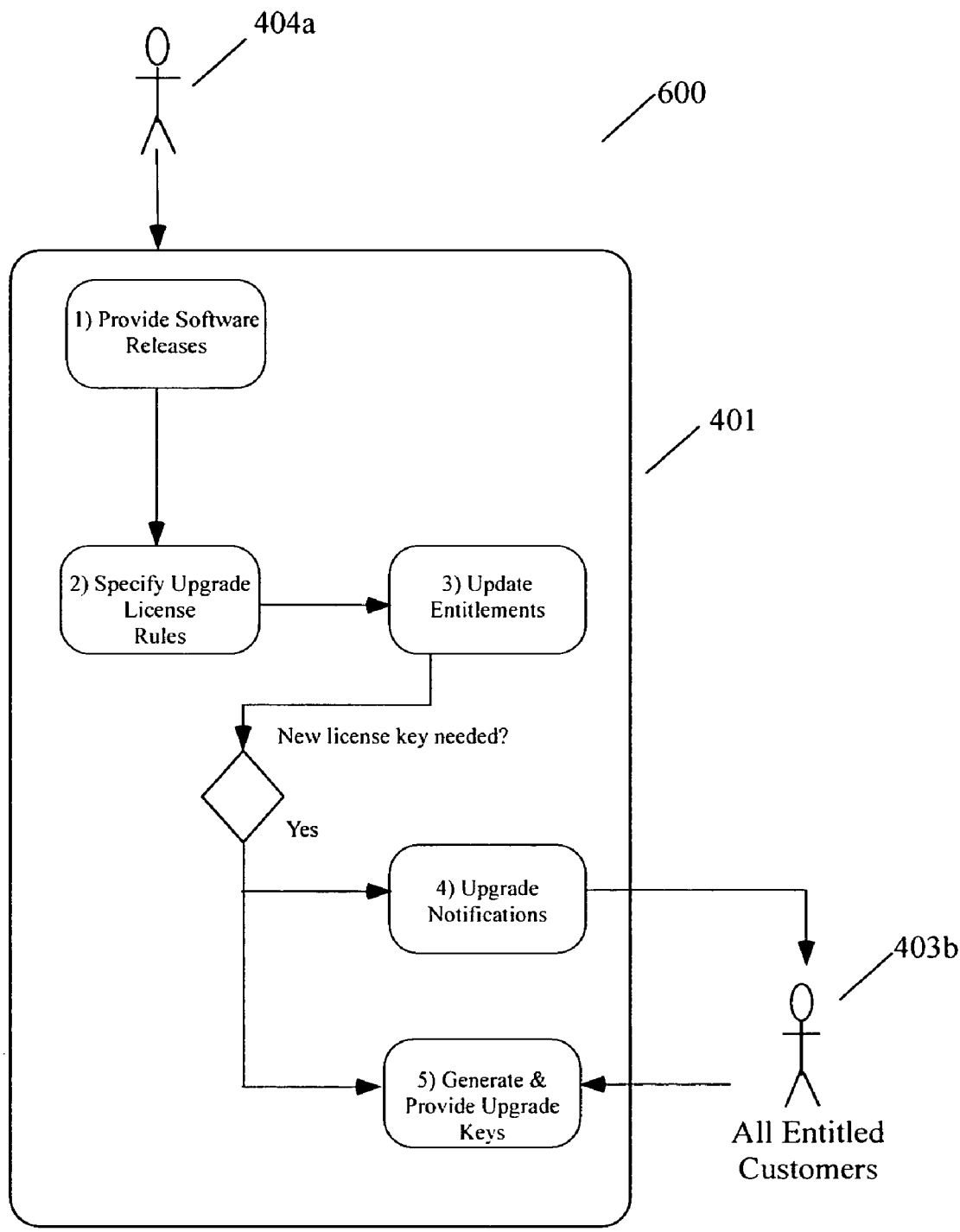
FIG. 6 is a flow diagram of a process for distributing digital goods upgrades and accompanying license keys according to the invention without processing an additional purchase order according to the invention.

Customers under software maintenance agreements are generally entitled to upgrades for the duration of their contract. Some upgrades require new license keys to operate. The most efficient way to provide new licenses without having to process costly additional orders is to have the fulfillment system automatically determine which users are entitled to upgrades. The invention provides a process whereby the actual software upgrade is provided to the customer in a proactive manner. Customers who can easily and proactively receive software and license upgrades typically have much higher customer satisfaction level and are more likely to renew a periodic software maintenance contract. FIG. 6 is a flow diagram of a process 600 for distributing digital goods upgrades and accompanying license keys according to the invention without processing an additional purchase order according to the invention.

1. At a later time than the effective subscription order date (but before the subscription's expiration date), a new 'Product' (version) is created and associated to the original 'Catalog Item' on the subscription order.
2. This 'Product' also specifies that a new license key, distinct from the original license keys that the customer obtained in step 5, is required to unlock it.

3. All 'Entitlements' that contain a 'Catalog Item' now containing the new Product and which have not yet expired are updated so as to allow the Customers usage of the new 'Product.'
4. If, as in step 2, the new 'Product' requires a new license, all Customers with 'Entitlements' described in step 3 are notified that the new 'Product' is available to them and that the new 'Product' requires a new set of license keys.
5. Customers who are entitled to receive the new 'Product' are able to generate license keys required to activate or operate the new 'Product.' In an alterative embodiment, the new license keys can be generated and sent directly via the notification in step 4.

Although the invention has been described herein with reference to certain preferred embodiments, one skilled in the art will readily appreciate that other applications may be substituted for those set forth herein without departing from the spirit and scope of the present invention. Accordingly, the invention should only be limited by the claims included below.

The invention claimed is:

1. A computer-driven system for managing access to digital products, comprising:
   at least one digital data processor; and
   at least one digital data storage device coupled to the processor, the digital data storage device including at least one computer readable storage medium storing executable instructions that when executed by the digital data processor cause the digital data processor to perform operations comprising:
      receiving from a vendor and storing in the storage device items comprising: one or more software products each associated with one of multiple catalog items, a license key associated with each of the software products, and a licensing rule associated with each of the catalog items;
      responsive to receiving orders from customers, each of said orders containing a reference to one of the catalog items where said catalog item is associated with one or more of the one or more software products, for each of said orders providing said customer from which the order was received with access to the one or more software products associated with the referenced catalog item by:
         creating or modifying an entitlement for the referenced catalog item said entitlement designating said customer in conjunction with the one or more software products associated with the referenced catalog item; and
         sending said customer a license key for each of said one or more software products associated with the referenced catalog item;
      receiving a first software product from a vendor and storing the first software product in the storage device;
      responsive to receiving the first software product, determining without receiving from said customers an update request for the first software product, that the first software product is an update of one or more of the software products stored in the storage device and associated with a given one of the catalog items;
      identifying customers who have been provided access to said one or more software products updated by the first software product, and for each said identified customer updating the entitlement by designating the first software product in conjunction with the identified customer; and
      based on the licensing rule and the updated entitlement for the given catalog item, for each identified customer generating one or more new license keys for the first software product and transmitting said one or more new license keys to said identified customer.

2. The system of claim 1, where the operation of generating one or more new license keys based on the licensing rule and the updated entitlement comprises: generating and transmitting the one or more new license keys only when required by the license rule.

3. The system of claim 1, where the operation of generating one or more new license keys based on the licensing rule and the updated entitlement comprises: automatically causing transmission of electronic notice to said identified customers, said notice stating availability of the first software product and also stating that the first software product requires a new license key.

4. The system of claim 1, where the operation of generating one or more new license keys based on the licensing rule and the updated entitlement comprises: providing instructions for said identified customers to self-generate said one or more new license keys.

5. The system of claim 1, the operation of generating one or more new license keys for the first software product and transmitting said one or more new license keys to said identified customer comprising: transmitting notification to said identified customer and then generating said one or more new license keys upon request by said identified customer.

6. The system of claim 1, where the operation of receiving the first software product from the vendor further comprises: receiving metadata associating the first software product with one of said catalog items.

7. The system of claim 1, where some or all of the software products comprise deliverable software releases.

8. The system of claim 1, where the licensing rule specifies that a new key, distinct from any licensing keys previously transmitted for software products associated with a catalog item, are required to unlock or control usage of software products newly associated with said catalog item.

9. The system of claim 1, each of said orders further including a subscription date, the operations further including incorporating the subscription dates into the entitlement in conjunction with the referenced catalog item.

10. The system of claim 1, further comprising storing information in the digital data storage device including license generation history for said customers.

11. The system of claim 1, where the entitlement correlates software products with customers subscribing thereto.

12. An article of manufacture comprising at least one computer readable storage medium containing machine-readable instructions that when executed by a computer cause the computer to perform operations comprising:
   receiving from a vendor and storing in the storage device items comprising: one or more software products each associated with one of multiple catalog items, a license key associated with each of the software products, and a licensing rule associated with each of the catalog items;
   responsive to receiving orders from customers, each of said orders containing a reference to one of the catalog items where said catalog item is associated with one or more of the one or more software products, for each of said orders providing said customer from which the order was received with access to the one or more software products associated with the referenced catalog item by:
      creating or modifying an entitlement for the referenced catalog item said entitlement designating said customer in conjunction with the one or more software products associated with the referenced catalog item; and sending said customer a license key for each of said one or more software products associated with the referenced catalog item;

receiving a first software product from a vendor and storing the first software product in the storage device;

responsive to receiving the first software product, determining without receiving from said customers an update request for the first software product, that the first software product is an update of one or more of the software products stored in the storage device and associated with a given one of the catalog items;

identifying customers who have been provided access to said one or more software products updated by the first software product, and for each said identified customer updating the entitlement by designating the first sofware product in conjunction with the identified customer; and based on the licensing rule and the updated entitlement for the given catalog item, for each identified customer generating one or more new license keys for the first software product and transmitting said one or more new license keys to said identified customer.

13. The article of manufacture of claim 12, where the operation of generating one or more new license keys based on the licensing rule and the updated entitlement comprises: generating and transmitting the one or more new license keys only when required by the license rule.

14. The article of manufacture of claim 12, where the operation of generating one or more new license keys based on the licensing rule and the updated entitlement comprises: automatically causing transmission of electronic notice to said identified customers, said notice stating availability of the first software product and also stating that the first software product requires a new license key.

15. The article of manufacture of claim 12, where the operation of generating one or more new license keys based on the licensing rule and the updated entitlement comprises: providing instructions for said identified customers to self-generate said one or more new license keys.

16. The article of manufacture of claim 12, the operation of generating one or more new license keys for the first software product and transmitting said one or more new license keys to said identified customer comprising: transmitting notification to said identified customer and then generating said one or more new license keys upon request by said identified customer.

17. The article of manufacture of claim 12, where the operation of receiving the first software product from the vendor further comprises: receiving metadata associating the first software product with one of said catalog items.

18. The article of manufacture of claim 12, where some or all of the software products comprise deliverable software releases.

19. The article of manufacture of claim 12, where the licensing rule specifies that a new key, distinct from any licensing keys previously transmitted for software products associated with a catalog item, are required to unlock or control usage of software products newly associated with said catalog item.

20. The article of manufacture of claim 12, each of said orders further including a subscription date, the operations further including incorporating the subscription dates into the entitlement in conjunction with the referenced catalog item.

21. The article of manufacture of claim 12, further comprising storing information in the digital data storage device including license generation history for said customers.

22. The article of manufacture of claim 12, where the entitlement correlates software products with customers subscribing thereto.

23. A method for managing access to digital products in a system that includes at least one digital data processor and at least one digital data storage device coupled to the processor, comprising operations of:

receiving from a vendor and storing in the storage device items comprising: one or more software products each associated with one of multiple catalog items, a license key associated with each of the software products, and a licensing rule associated with each of the catalog items;

receiving orders from customers, each of said orders containing a reference to one of the catalog items where said catalog item is associated with one or more of the one or more software products, and responsive to receiving each of said orders providing said customer from which the order was received with access to the one or more software products associated with the referenced catalog item by:

creating or modifying an entitlement for the referenced catalog item said entitlement designating said customer in conjunction with the one or more software products associated with the referenced catalog item; and sending said customer a license key for each of said one or more software products associated with the referenced catalog item;

receiving a first software product from a vendor and storing the first software product in the storage device;

responsive to receiving the first software product, the processor determining without receiving from said customers an update request for the first software product, that the first software product is an update of one or more of the software products stored in the storage device and associated with a given one of the catalog items;

the processor identifying customers who have been provided access to said one or more software products updated by the first software product, and for each said identified customer updating the entitlement by designating the first sofware product in conjunction with the identified customer; and based on the licensing rule and the updated entitlement for the given catalog item, for each identified customer the processor generating one or more new license keys for the first software product and transmitting said one or more new license keys to said identified customer.

24. The method of claim 23, where the operation of generating one or more new license keys based on the licensing rule and the updated entitlement comprises: generating and transmitting the one or more new license keys only when required by the license rule.

25. The method of claim 23, where the operation of generating one or more new license keys based on the licensing rule and the updated entitlement comprises: automatically causing transmission of electronic notice to said identified customers, said notice stating availability of the first software product and also stating that the first software product requires a new license key.

26. The method of claim 23, where the operation of generating one or more new license keys based on the licensing rule and the updated entitlement comprises: providing instructions for said identified customers to self-generate said one or more new license keys.

27. The method of claim 23, the operation of generating one or more new license keys for the first software product and transmitting said one or more new license keys to said identified customer comprising: transmitting notification to said identified customer and then generating said one or more new license keys upon request by said identified customer.

28. The method of claim 23, where the operation of receiving the first software product from the vendor further comprises: receiving metadata associating the first software product with one of said catalog items.

29. The method of claim 23, where some or all of the software products comprise deliverable software releases.

30. The method of claim 23, where the licensing rule specifies that a new key, distinct from any licensing keys previously transmitted for software products associated with a catalog item, are required to unlock or control usage of software products newly associated with said catalog item.

31. The method of claim 23, each of said orders further including a subscription date, the operations further including incorporating the subscription dates into the entitlement in conjunction with the referenced catalog item.

32. The method of claim 23, further comprising storing information in the digital data storage device including license generation history for said customers.

33. The method of claim 23, where the entitlement correlates software products with customers subscribing thereto.

* * * * *